Feb. 14, 1961 C. S. GLENNY Re. 24,935

HAMBURGER PRESS

Original Filed Jan. 14, 1957

Inventor
CLARENCE S. GLENNY

Andrew F. Winterscorn

Atty.

United States Patent Office

Re. 24,935
Reissued Feb. 14, 1961

24,935

HAMBURGER PRESS

Clarence S. Glenny, Rockford, Ill., assignor to The Washburn Company, Worcester, Mass., a corporation of Massachusetts Original No. 2,929,099, dated Mar. 22, 1960, Ser. No. 633,964, Jan. 14, 1957. Application for reissue Aug. 23, 1960, Ser. No. 51,478

12 Claims. (Cl. 17—32)

Matter enclosed in heavy brackets [ ] appears in the original patent but forms no part of this reissue specification; matter printed in italics indicates the additions made by reissue.

This invention relates to a utensil for use in forming ground meat into hamburger patties and has for its principal object the provision of a ring body of the correct diameter in relation to hamburger bun size, mounted on a handle for easier holding and better control of operation and designed to slidably support a disc inserted in either of two positions for the molding of a thick or a thin patty, according to the position of the disk, the patties being easily removable from the ring with the disk by pressure on the back of the disk.

In the present design an annular inwardly projecting flange is provided on one side of the ring body on which a disk is arranged to be supported in direct engagement with the flange or in elevated relationship thereto by means of vertical ribs projecting inwardly from the inner periphery of the ring above the flange, the disk being adapted to rest on top of these ribs but having notches in its periphery arranged to receive the ribs and allow the disk to drop down onto the flange, whereby when the disk is disposed on top of the ribs a shallower recess is defined in the ring to accommodate a relatively thin patty, and, when it rests on the flange, a deeper recess is defined to accommodate a relatively thick patty.

The invention is illustrated in the accompanying drawing, in which.

Similar reference numerals are applied to corresponding parts in these views.

Figure 3:
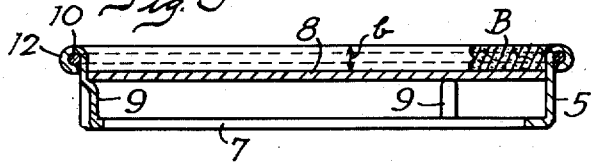
Fig. 3 is a cross-section in the plane of the line 3—3 of Fig. 2, showing the utensil set for use in making thin patties.

Referring to the drawing, the reference numeral 5 designates a ring formed from a single strip of sheet metal, the opposite ends of which are joined together by a seam at 6 in a conventional manner. An annular inwardly projecting flange 7 is formed on the bottom of the ring to define an annular supporting ledge or shoulder for a sheet metal disk 8, the disk being adapted to rest directly on this shoulder or flange, as in Fig. 4, to define a deeper recess, indicated by dimension a, for use in the making of thicker patties A, or being adapted to be supported at three evenly circumferentially spaced points on the upper ends of three vertical ribs 9 in elevated relation to the flange, as in Fig. 3, to define a shallower recess, indicated by dimension b, for use in the making of thinner patties B, the ribs 9 being provided as integral inwardly projecting portions of the ring 5, all of the ribs being of the same length measured upwardly from the flange 7 so that the disk 8 is supported parallel to the flange 7, as seen in Fig. 3. A wire ring frame 10 for supporting the ring 5 on a handle 11 is secured to the ring in the curled upper edge 12 thereof. The rounded edge 12 defines a flared entrance into the ring 5, as is evident in the sectional views, Figs. 3 and 4, and this facilitates entry of the close fitting disk 8. The spaced, substantially radial, outwardly projecting end portions 13 of the wire 10 have their extremities 14 offset inwardly toward one another and welded together, as indicated at 15, to define a slightly resilient and compressible shank adapted to be pressed into an axial bore 16 provided therefor in the inner end of the handle 11 for the rigid support of the ring 5 on the handle. The curling of the upper edge portion 12 of the ring, and the flanging of the bottom edge portion 7 eliminates raw edges, and hence, there is nothing to scratch or cut the hands when using the utensil in the forming of hamburger patties with ground meat.

Figure 1:
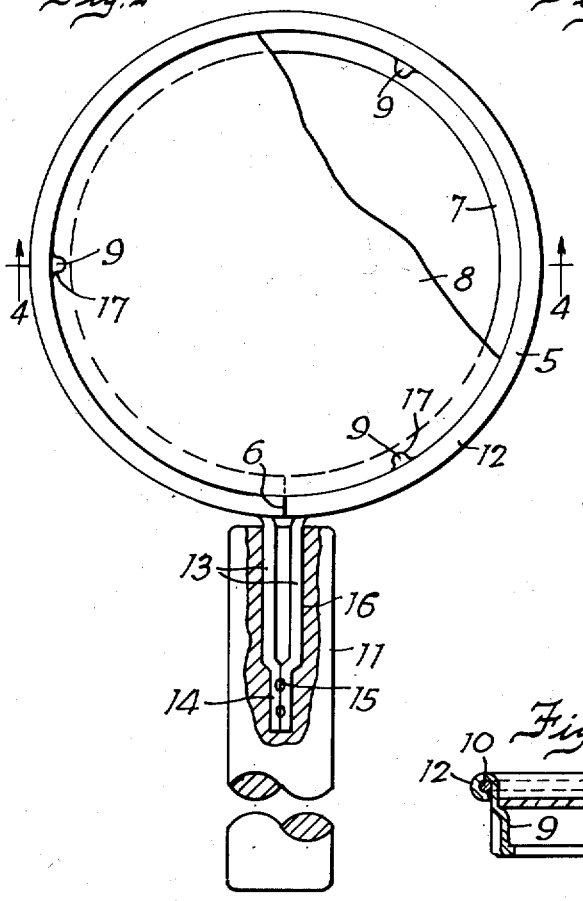
Fig. 1 is a plan view of a hamburger press made in accordance with my invention, showing the disk resting on the flange, a portion of the disk being broken away to show the flange therebeneath, and a portion of the handle being broken away and shown in section to show the supporting shank of the ring frame which has a press fit in the handle.
Figure 2:
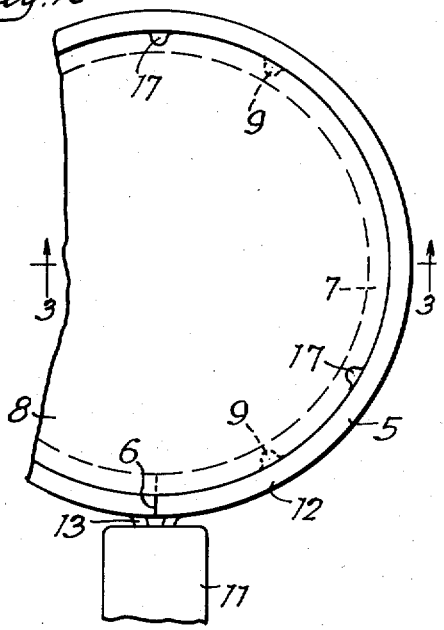
Fig. 2 is a similar view with the disk elevated and turned so as to shift the notches out of register with the ribs so that the disk is supported on their upper ends.
Figure 4:
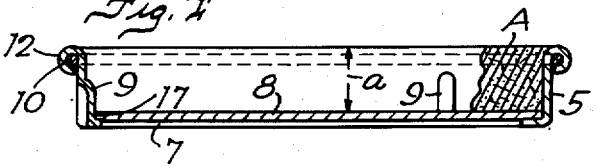
Fig. 4 is a similar view taken on line 4—4 of Fig. 1, showing the utensil set for use in making thick patties.

In operation, the sheet metal disk 8, which is disposed in the ring 5 and is of approximately the same diameter as the conventional hamburger bun, is inserted with a snug sliding fit into the ring resting either on top of the ribs 9 to form a thin patty, as indicated at B in Fig. 3, or on the flange 7 to form a thick patty, as indicated at A in Fig. 4. Notches 17 are provided in the periphery of the disk 8 in evenly circumferentially spaced relation, and it is only when they are in register with the ribs 9 (as in Figs. 1 and 4) that the disk can drop down onto the flange. In Figs. 2 and 3 the disk is turned so as to shift these notches out of register with the ribs. The patties can be made quite uniform in either thickness and one gets four of the thicker patties A out of one pound of ground meat, and eight of the thinner patties B out of one pound of ground meat. A spatula or the like may be used in filling the utensil evenly for either thickness of patty, and then the ring 5 is turned over my means of handle 11 and pressure is applied to the back of the disk 8 to remove it with the patty from the ring, whereupon the patty may then be easily stripped off the disk with the spatula directly into the frying pan. There are no crevices in which food or filth might collect, and hence it is an easy matter to keep the press clean and sanitary. The close sliding fit of the disk 8 in the ring 5 eliminates any likelihood of the disk falling out when the utensil is not in use, and hence there is no danger of the disk being lost or mislaid by reason of being separated from the utensil, and since it remains an assembled part of the utensil, it is in no danger of becoming bent or battered by contact with other heavier utensils, and the utensil always remains in good shape and ready for instant use. While this utensil was designed primarily as a hamburger press it should be clear that it is not limited to that specific use. Utensils made along these same lines could be used for forming patties of any plastic food or other material.

Figure 5:
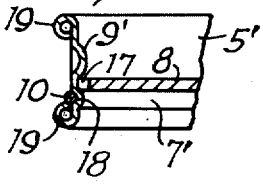
Fig. 5 is a sectional detail along the lines of 4 but showing a modified or alternative construction.

In Fig. 5, the sheet metal disk 8 is the same as that of Figs. 1–4, having notches 17 in the periphery, which when disposed in registry with inwardly projecting ribs 9′ formed on the sheet metal ring 5′ permit the disk to drop down onto the top of an annular inwardly projecting bead 7′ formed in the ring 5′ below the ribs 9; this bead defining the annular shoulder otherwise defined by the flange 7 of the other construction. The bead 7′ defines an annular groove 18 in the outer periphery of the ring in which to accommodate with a tight fit the wire ring frame 10 for supporting the ring 5' on a handle 11, in the same way as in the other form. The opposite sides of the ring 5' have rounded edges by reason of the curling of the edge portions of the ring, as indicated at 19, so that the flared entrance into the top of the ring is defined as in the other form and also so that there are no raw edges left exposed, and, hence, nothing to scratch or cut the hands when using the utensil in the forming of hamburger patties from ground meat. The operation of this utensil is the same as the other and, therefore, no further description is necessary.

It is believed the foregoing description conveys a good understanding of the objects and advantages of my invention. The appended claims have been drawn to cover all legitimate modifications and adaptations.

I claim:

1. A utensil of the character described comprising, in combination, a sheet metal ring shaped body of substantially uniform width and having an annular inwardly projecting shoulder provided therein, a disk having a close sliding fit in said ring body and adapted to be supported on said shoulder, whereby to define with said disk a recess in said ring body for use in the making of patties of plastic food or other material, the patties being expellable from said ring body with said disk, one edge portion of said ring body defining the entrance thereto being curled outwardly to define a rounded edge so that the entrance is flared and entry of said close fitting disk is facilitated, said ring body having inwardly projecting ribs provided therein in circumferentially spaced parallel relation substantially at right angles to the aforesaid shoulder and all of approximately the same length measured from said shoulder and terminating in uniformly spaced relation to the aforesaid flared entrance, and said disk having notches provided in its periphery in the same circumferentially spaced relation as the ribs which receive said ribs loosely when the disk is supported on said shoulder.

2. A utensil as set forth in claim 1, including a wire ring frame fitting inside the outwardly curled edge portion of said body and extending completely around said ring body for support thereof and having an operating and supporting handle extension.

3. A utensil as set forth in claim 1, including a wire ring frame fitting inside the outwardly curled edge portion of said body and extending completely around said ring body for support thereof and having an operating and supporting handle extension, and an elongated handle having an axial bore provided in one end thereof in which said handle extension is engaged, said handle extension being defined by spaced substantially parallel end portions of said wire of appreciable length, the outer extremities of which are secured together, said spaced portions being resilient and compressible toward each other in the insertion of said handle extension into the bore in said handle.

4. A utensil of the character described comprising, in combination, a sheet metal ring shaped body of substantially uniform width and having an annular inwardly projecting shoulder provided therein, a disk having a close sliding fit in said ring body whereby to define with said disk a recess in said ring body for use in the making of patties of plastic food or other material, the patties being expellable from said ring body with said disk, one edge portion of said ring body defining the entrance thereto being curled outwardly to define a rounded edge so that the entrance is flared and entry of said close fitting disk is facilitated, said ring body having inwardly projecting ribs provided therein in circumferentially spaced parallel relation substantially at right angles to the aforesaid shoulder and all of approximately the same length measured from said shoulder, said disk resting on the ends of said ribs in elevated substantially parallel relationship to said shoulder, whereby to define with said disk a shallow recess in said ring body above said ribs for use in making thin patties of uniform thickness, said disk having notches provided in its periphery in the same circumferential spaced relation as the ribs and adapted when said disk is turned to align the notches with the ribs to receive said ribs loosely.

5. A utensil as set forth in claim 4, including a wire ring frame fitting inside the outwardly curled edge portion of said body and extending completely around said ring body for support thereof and having an operating and supporting handle extension.

6. A utensil as set forth in claim 4, including a wire ring frame fitting inside the outwardly curled edge portion of said body and extending completely around said ring body for support thereof and having an operating and supporting handle extension, and an elongated handle having an axial bore provided in one end thereof in which said handle extension is engaged, said handle extension being defined by spaced substantially parallel end portions of said wire of appreciable length, the outer extremities of which are secured together, said spaced portions being resilient and compressible toward each other in the insertion of said handle extension into the bore in said handle.

7. A utensil as set forth in claim 1, wherein said sheet metal ring shaped body has an annular inwardly projecting bead provided therein defining the annular shoulder on the inside of the ring body and defining an annular groove in the outer periphery of said ring body, said utensil including a wire ring frame fitting in and extending completely around said annular groove for support of said ring body and having an operating and supporting handle extension.

8. A utensil as set forth in claim 1, wherein said sheet metal ring shaped body has an annular inwardly projecting bead provided therein defining the annular shoulder on the inside of the ring body and defining an annular groove in the outer periphery of said ring body, said utensil including a wire ring frame fitting in and extending completely around said annular groove for support of said ring body and having an operating and supporting handle extension, and an elongated handle having an axial bore provided in one end thereof in which said handle extension is engaged, said handle extension being defined by spaced substantially parallel end portions of said wire of appreciable length, the outer extremities of which are secured together, said spaced portions being resilient and compressible toward each other in the insertion of said handle extension into the bore in said handle.

9. A utensil as set forth in claim 4, wherein said sheet metal ring shaped body has an annular inwardly projecting bead provided therein defining the annular shoulder on the inside of the ring body and defining an annular groove in the outer periphery of said ring body, said utensil including a wire ring frame fitting in and extending completely around said annular groove for support of said ring body and having an operating and supporting handle extension.

10. A utensil as set forth in claim 4, wherein said sheet metal ring shaped body has an annular inwardly projecting bead provided therein defining the annular shoulder on the inside of the ring body and defining an annular groove in the outer periphery of said ring body, said utensil including a wire ring frame fitting in and extending completely around said annular groove for support of said ring body and having an operating and supporting handle extension, and an elongated handle having an axial bore provided in one end thereof in which said handle extension is engaged, said handle extension being defined by spaced substantially parallel end portions of said wire of appreciable length, the outer extremities of which are secured together, said spaced portions being resilient and compressible toward each other in the insertion of said handle extension into the bore in said handle.

*11. A utensil of the character described comprising, in combination, a ring shaped body of substantially uniform width and having an entrance end and an annular inwardly projecting shoulder provided therein at the other end, a disk having a close sliding fit in said ring body and adapted to be supported on said shoulder, whereby to define with said disk a recess of a predetermined depth in said ring body for use in the making of patties of plastic food or other material of a predetermined thickness, the patties being expellable from the entrance end of said ring body by means of said disk, said ring body having inwardly projecting ribs provided therein in circumferentially spaced parallel relation substantially at right angles to the aforesaid shoulder and all of approximately the same length measured from said shoulder and terminating in uniformly spaced relation to the aforesaid entrance end of said body, and said disk having notches provided in its periphery in the same circumferentially spaced relation as the ribs which receive said ribs loosely when the disk is supported on said shoulder.*

*12. A utensil of the character described comprising, in combination, a ring shaped body of substantially uniform width and having an entrance end and an annular inwardly projecting shoulder provided therein at the other end, a disk having a close sliding fit in said ring body whereby to define with said disk a recess in said ring body for use in the making of patties of plastic food or other*

*material, the patties being expellable from the entrance end of said ring body by means of said disk, said ring body having inwardly projecting ribs provided therein in circumferentially spaced parallel relation substantially at right angles to the aforesaid shoulder and all of approximately the same length measured from said shoulder, said disk resting on the ends of said ribs in elevated substantially parallel relationship to said shoulder, whereby to define with said disk a shallow recess in said ring body above said ribs for use in making thin patties of uniform thickness, said disk having notches provided in its periphery in the same circumferentially spaced relation as the ribs and adapted when said disk is turned to align the notches with the ribs to receive said ribs loosely permitting shifting of the disk to a position resting on said annular shoulder.*

References Cited in the file of this patent or the original patent

UNITED STATES PATENTS

| | | |
|---|---|---|
| 197,561 | Morse | Nov. 27, 1877 |
| 476,137 | Eustis | May 31, 1892 |
| 1,172,508 | Wheeler | Feb. 22, 1916 |
| 1,462,880 | Altman | July 24, 1923 |
| 1,986,864 | Tolley | Jan. 8, 1935 |
| 2,650,552 | Wood | Sept. 1, 1953 |
| 2,722,713 | Oestermeyer | Nov. 8, 1955 |